United States Patent
Lee et al.

(10) Patent No.: US 9,211,501 B2
(45) Date of Patent: *Dec. 15, 2015

(54) REDUCING AGENT SUPPLY DEVICE AND EXHAUST GAS DENITRIFICATION SYSTEM USING THE SAME

(75) Inventors: Soo-Tae Lee, Busan (KR); Won-Suk Choi, Busan (KR); Gyeong-Woo Kang, Busan (KR)

(73) Assignee: Panasia Co., LTD., Busan (KR)

( * ) Notice: Subject to any disclaimer, the term of this patent is extended or adjusted under 35 U.S.C. 154(b) by 348 days.

This patent is subject to a terminal disclaimer.

(21) Appl. No.: 13/703,889

(22) PCT Filed: Jun. 20, 2011

(86) PCT No.: PCT/KR2011/004480
§ 371 (c)(1),
(2), (4) Date: Dec. 12, 2012

(87) PCT Pub. No.: WO2011/162513
PCT Pub. Date: Dec. 29, 2011

(65) Prior Publication Data
US 2013/0101472 A1    Apr. 25, 2013

(30) Foreign Application Priority Data
Jun. 21, 2010  (KR) .......................... 10-2010-0058708

(51) Int. Cl.
*B01D 53/56*    (2006.01)
*B01D 53/90*    (2006.01)
(Continued)

(52) U.S. Cl.
CPC ............ *B01D 53/74* (2013.01); *B01D 53/8625* (2013.01); *F01N 3/2066* (2013.01);
(Continued)

(58) Field of Classification Search
CPC .... B01D 53/74; B01D 53/8625; B01D 53/90; B01D 2251/2062; F01N 3/2066; F01N 2610/00; F01N 2610/02; F01N 2610/1466; F01N 2610/1493

USPC ........... 422/168, 172, 177; 60/295; 134/22.1; 239/106, 112; 137/15.05
See application file for complete search history.

(56) References Cited

U.S. PATENT DOCUMENTS 5,601,792 A    2/1997  Hug et al.
6,432,373 B1   8/2002  Tanazawa et al.
(Continued)

FOREIGN PATENT DOCUMENTS

JP    9-150038      6/1997
JP    2005-105913   4/2005
(Continued)

OTHER PUBLICATIONS

Machine translation of JP2006-342736 (Dec. 21, 2006).*
(Continued)

Primary Examiner — Jill Warden
Assistant Examiner — Joye L Woodard
(74) Attorney, Agent, or Firm — Workman Nydegger (57) ABSTRACT

This invention relates to a reducing agent supply device and an exhaust gas denitrification system using the same. The reducing agent supply device includes a reducing agent supply unit for supplying a reducing agent to a selective supply unit, a water supply unit for supplying water to the selective supply unit, the selective supply unit for selectively supplying any one of the reducing agent and water supplied from the reducing agent supply unit and the water supply unit to a spray unit, and the spray unit for spraying the reducing agent or water supplied from the selective supply unit, wherein the selective supply unit supplies water to the spray unit when the spray unit is blocked due to solidification of the reducing agent which remains behind therein because of a process in which the spray unit continuously sprays the reducing agent or a temporary malfunction of the device, thereby preventing blockage of the spray unit. Also an exhaust gas denitrification system using the device is provided.

9 Claims, 5 Drawing Sheets

(51) Int. Cl.
  *B01D 53/74* (2006.01)
  *F01N 3/20* (2006.01)
  *B01D 53/86* (2006.01)

(52) U.S. Cl.
  CPC ..... *B01D2251/2062* (2013.01); *F01N 2610/00* (2013.01); *F01N 2610/02* (2013.01); *F01N 2610/1466* (2013.01); *F01N 2610/1493* (2013.01); *Y02T 10/24* (2013.01)

(56) References Cited

U.S. PATENT DOCUMENTS 9,089,817 B2 * 7/2015 Lee et al. ..................... 422/169

2006/0248880 A1  11/2006 Hirata et al.

FOREIGN PATENT DOCUMENTS

| JP | 2006-342736 | * 12/2006 |
| JP | 2007-000783 | 1/2007 |
| JP | 2009-264191 | 11/2009 |

OTHER PUBLICATIONS

International Search Report dated Mar. 19, 2012, issued in PCT Application No. PCT/KR2011/004480, filed Jun. 20, 2011.

* cited by examiner

Figure 1

PRIOR ART

REDUCING AGENT SUPPLY DEVICE AND EXHAUST GAS DENITRIFICATION SYSTEM USING THE SAME

TECHNICAL FIELD

The present invention relates to a reducing agent supply device and an exhaust gas denitrification system using the same, and, more particularly, to a reducing agent supply device, which comprises a reducing agent supply unit for supplying a reducing agent to a selective supply unit, a water supply unit for supplying water to the selective supply unit, the selective supply unit for selectively supplying any one of the reducing agent and water, which were supplied from the reducing agent supply unit and the water supply unit, to a spray unit, and the spray unit for spraying the reducing agent or water supplied from the selective supply unit, wherein the selective supply unit supplies water to the spray unit when the spray unit is blocked due to solidification of the reducing agent which remains behind therein because of a process in which the spray unit continuously sprays the reducing agent or a temporary malfunction of the device, thereby preventing blockage of the spray unit, and to an exhaust gas denitrification system using the same.

BACKGROUND ART

Exhaust gases discharged from thermal power plants, etc., using fossil fuel as an energy source contain a large amount of nitrogen oxide (NOx), and such nitrogen oxide is known to cause acid rain and respiratory diseases. Thus, a variety of techniques for removing nitrogen oxide from exhaust gases are being developed.

Figure 1:
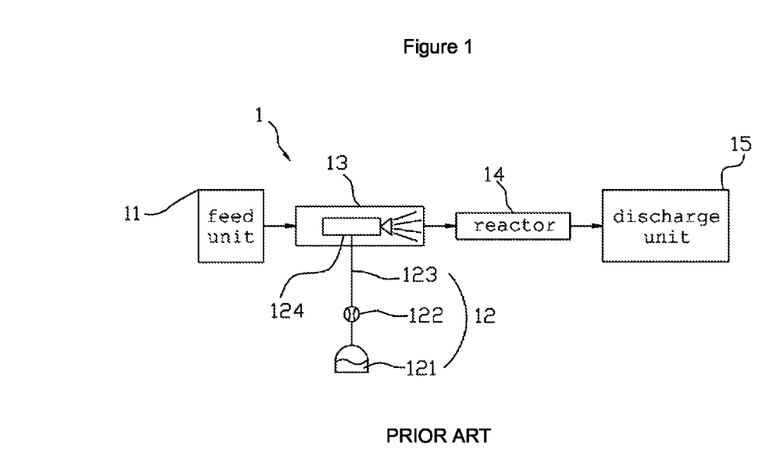
FIG. 1 illustrates a conventional exhaust gas denitrification system.

FIG. 1 illustrates a conventional exhaust gas denitrification system using selective catalytic reduction (SCR) which is the most widely used to remove nitrogen oxide. With reference to FIG. 1, a conventional exhaust gas denitrification system 1 is configured such that aqueous urea is sprayed into a reaction chamber 13 via a spray unit 124 and thus is converted into gaseous ammonia using waste heat of exhaust gas, so that a gas mixture of exhaust gas and ammonia is fed into a reactor 14. The gas mixture fed into the reactor 14 undergoes a denitrification reaction in the presence of a catalyst, whereby nitrogen oxide is removed from the exhaust gas.

However, in the course of continuously spraying aqueous urea into the reaction chamber 13 via the spray unit 124, the aqueous urea fed into the spray unit 124 is not completely discharged into the reaction chamber 13 but may partially remain behind in the spray unit 124. As such, the remaining aqueous urea is problematic because it may solidify and undesirably block the spray unit 124.

Also, in the course of continuously feeding the aqueous urea into the spray unit 124, the aqueous urea has predetermined viscosity, and thus a dead zone where aqueous urea does not flow but remains still is created in an aqueous urea passage 123 between an outlet of a flow control pump 122 and the spray unit 124. The aqueous urea which does not flow but remains still solidifies, and the solidification thereof is further carried out in the course of continuously supplying the aqueous urea to the spray unit, undesirably blocking the aqueous urea passage 123 due to the solidified urea.

Moreover, in the case where the exhaust gas denitrification system 1 ceases to operate due to a temporary malfunction, the aqueous urea remains behind in the aqueous urea passage 123 or the spray unit 124 and thus solidifies, undesirably blocking the aqueous urea passage 123 or the spray unit 124.

DISCLOSURE

Technical Problem

Accordingly, the present invention has been made keeping in mind the above problems occurring in the related art, and an object of the present invention is to provide a reducing agent supply device, which includes a selective supply unit for selectively supplying either a reducing agent or water to a spray unit, thus preventing blockage of a reducing agent passage and a spray unit due to solidification of the reducing agent which remains behind therein because of a process in which the spray unit continuously sprays the reducing agent or because of a temporary malfunction of the device, and an exhaust gas denitrification system using the same.

Another object of the present invention is to provide a reducing agent supply device, which includes an air bypass for supplying air to a reducing agent passage from an air supply unit, so that a reducing agent which remains behind in the reducing agent passage and a spray unit is removed by water and then air is supplied, thus ensuring the removal of the remaining reducing agent, and also the reducing agent passage and the spray unit may be dried using air, thereby preventing the reducing agent passage from corroding and ensuring that the concentration of the reducing agent does not change when the reducing agent is supplied again, and an exhaust gas denitrification system using the same.

Still another object of the present invention is to provide a reducing agent supply device, which includes an air bypassing passage for supplying air to a water passage from an air supply unit, so that a reducing agent which remains behind in a reducing agent passage and a spray unit is removed by water and then a detergent passage and a reducing agent passage may be prevented from corroding due to water, and an exhaust gas denitrification system using the same.

Yet another object of the present invention is to provide a reducing agent supply device, in which a selective supply unit is provided in the form of a small panel thus minimizing the volume of the selective supply unit, and the length of a reducing agent passage is set to less than 2 m, thereby minimizing the amount of the reducing agent which remains behind in the reducing agent passage and thus solidifies due to continuous use of the reducing agent supply device or a temporary malfunction thereof, and an exhaust gas denitrification system using the same.

Technical Solution

In order to accomplish the above objects, the present invention is embodied according to embodiments having the following configurations.

According to an embodiment of the invention, a reducing agent supply device having a cleaning function comprises a reducing agent supply unit for supplying a reducing agent to a selective supply unit, a water supply unit for supplying water to the selective supply unit, the selective supply unit for selectively supplying any one of the reducing agent and the water supplied from the reducing agent supply unit and the water supply unit to a spray unit, and the spray unit for spraying the reducing agent or the water supplied from the selective supply unit, wherein the selective supply unit supplies water to the spray unit when the spray unit is blocked due to solidification of the reducing agent which remains behind therein because of a process in which the spray unit continuously sprays the reducing agent or a temporary malfunction of the device, thus preventing blockage of the spray unit.

According to another embodiment of the present invention, in the reducing agent supply device having a cleaning function, the selective supply unit comprises a flow control valve both inlets of which are connected to the reducing agent supply unit and the water supply unit, respectively, so that supply of the reducing agent or the water to a reducing agent passage is controlled, and the reducing agent passage one end of which is connected to an outlet of the flow control valve and the other end of which is connected to the spray unit.

According to still another embodiment of the present invention, in the reducing agent supply device having a cleaning function, the selective supply unit further comprises a flow control pump which is connected to one side of the reducing agent passage so as to suck the reducing agent or the water depending on a switching state of the flow control valve.

According to still another embodiment of the present invention, in the reducing agent supply device having a cleaning function, the reducing agent supply device further comprises an air supply unit for supplying air to the selective supply unit, and the selective supply unit further comprises an air passage one end of which is connected to the air supply unit and the other end of which is connected to the spray unit, an air bypass one end of which is connected to the air passage and the other end of which is connected to the reducing agent passage, an air control valve located at a position where the air passage and the air bypass are connected so that supply of air to the air passage or the air bypass is controlled, and a backflow prevention valve located at a position where the air bypass and the reducing agent passage are connected so that the reducing agent or water fed into the reducing agent passage is prevented from being fed into the air bypass.

According to still another embodiment of the present invention, in the reducing agent supply device having a cleaning function, the reducing agent supply device further comprises an air supply unit for supplying air to the selective supply unit, and the selective supply unit comprises an air regulating valve an inlet of which is connected to the air supply unit so that supply of air to an air passage or an air bypassing passage is controlled; the air passage one end of which is connected to one outlet of the air regulating valve and the other end of which is connected to the spray unit; the air bypassing passage one end of which is connected to the other outlet of the air regulating valve and the other end of which is connected to one inlet of a water regulating valve; the water regulating valve both inlets of which are respectively connected to the water supply unit and the other end of the air bypassing passage so that selective supply of air or water to a water passage is controlled; the water passage one end of which is connected to an outlet of the water regulating valve and the other end of which is connected to one inlet of a reducing agent regulating valve; the reducing agent regulating valve both inlets of which are respectively connected to the reducing agent supply unit and the other end of the water passage so that supply of the air, the water and the reducing agent to a reducing agent passage is controlled; and the reducing agent passage one end of which is connected to an outlet of the reducing agent regulating valve and the other end of which is connected to the spray unit.

According to still another embodiment of the present invention, in the reducing agent supply device having a cleaning function, the reducing agent passage has a length of less than 2 m, so that the amount of the reducing agent which remains behind in the reducing agent passage is minimized.

According to a further embodiment of the present invention, an exhaust gas denitrification system comprises a reducing agent supply device for supplying a reducing agent to an inside of a reaction chamber, a reaction chamber configured such that a fed exhaust gas and the reducing agent supplied from the reducing agent supply device are mixed to produce a gas mixture which is then supplied to a reactor, and the reactor for denitrifying the gas mixture supplied from the reaction chamber, wherein the reducing agent supply device is the reducing agent supply device having a cleaning function set forth in any one of claims 1 to 5.

Advantageous Effects

According to the present invention, a selective supply unit for selectively supplying either a reducing agent or water to a spray unit is provided, thus preventing blockage of a reducing agent passage and a spray unit due to solidification of the reducing agent which remains behind therein because of a process in which the spray unit continuously sprays the reducing agent or because of a temporary malfunction of the device.

Also, according to the present invention, an air bypass for supplying air to a reducing agent passage from an air supply unit is provided, so that a reducing agent which remains behind in the reducing agent passage and a spray unit is removed by water and then air is supplied, thus ensuring the removal of the remaining reducing agent, and furthermore, the reducing agent passage and the spray unit can be dried using air, thereby preventing the reducing agent passage from corroding and ensuring that the concentration of the reducing agent does not change when the reducing agent is supplied again.

Also, according to the present invention, an air bypassing passage for supplying air to a water passage from an air supply unit is provided, so that a reducing agent which remains behind in a reducing agent passage and a spray unit is removed by water and then a water passage and a reducing agent passage can be prevented from corroding due to water.

Also, according to the present invention, a selective supply unit is provided in the form of a small panel, thus minimizing the volume of the selective supply unit, and the length of the reducing agent passage is set to less than 2 m, thereby minimizing the amount of the reducing agent which remains behind in the reducing agent passage and thus solidifies due to continuous use of the reducing agent supply device or a temporary malfunction thereof.

DESCRIPTION OF THE REFERENCE NUMERALS IN THE DRAWINGS

21: feed unit
22: reducing agent supply device

23: reaction chamber
24: reactor
25: control unit
26: discharge unit
211: output sensor
221: air supply unit
222: reducing agent supply unit
223: water supply unit
224, 224', 224": selective supply unit
225: spray unit
261: analyzer
2211: air compression unit
2221: reducing agent storage tank
2222: reducing agent supply pump
2231: water storage tank
2232: water supply pump
2241: air flow control valve
2242, 2242': air passage
2243, 2243': flow control valve
2244, 2244': reducing agent passage
2245, 2245': flow control pump
2246': air bypass
2247': air control valve
2248': backflow prevention valve
2241": air regulating valve
2242": air passage
2243": air bypassing passage
2244": water regulating valve
2245": water passage
2246": reducing agent regulating valve
2247": reducing agent passage

MODE FOR INVENTION

Hereinafter, a detailed description will be given of a reducing agent supply device and an exhaust gas denitrification system using the same according to the present invention, with reference to the appended drawings. Wherever possible, the same reference numerals will be used throughout the drawings to refer to the same or like parts. In the following description, it is to be noted that, when the known functions and configurations related with the present invention may make the gist of the present invention unclear, a detailed description thereof will be omitted. Unless otherwise defined, all terms used herein should be interpreted as having the same meaning as commonly understood by one of ordinary skill in the art to which this invention belongs. If the meaning of any of the terms used herein is different from the meaning as commonly understood by one of ordinary skill in the art, the term should be interpreted as having the definition used herein.

Figure 2:
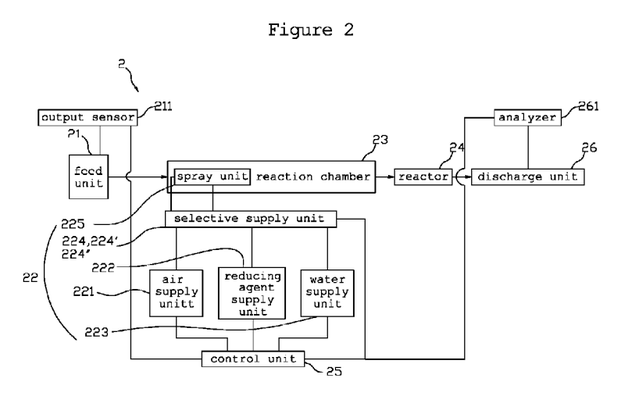
FIG. 2 is a block diagram illustrating an exhaust gas denitrification system according to an embodiment of the present invention.
Figure 3:
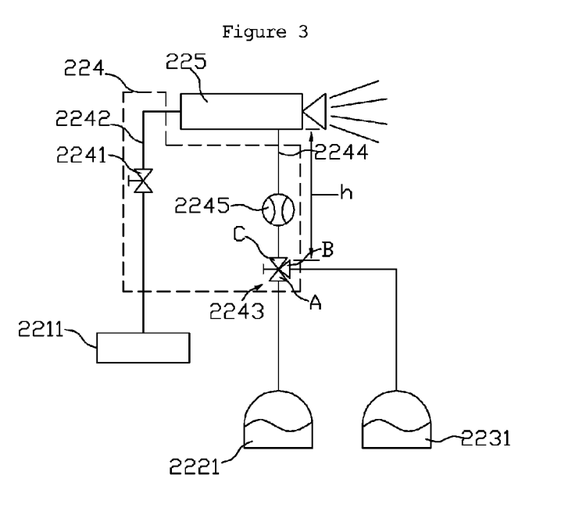
FIG. 3 is an enlarged view fully illustrating a reducing agent supply device according to an embodiment of the present invention.
Figure 4:
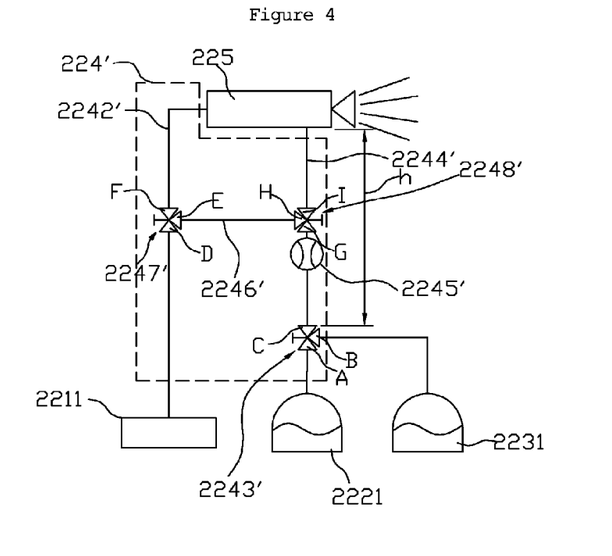
FIG. 4 is an enlarged view fully illustrating a reducing agent supply device according to another embodiment of the present invention.
Figure 5:
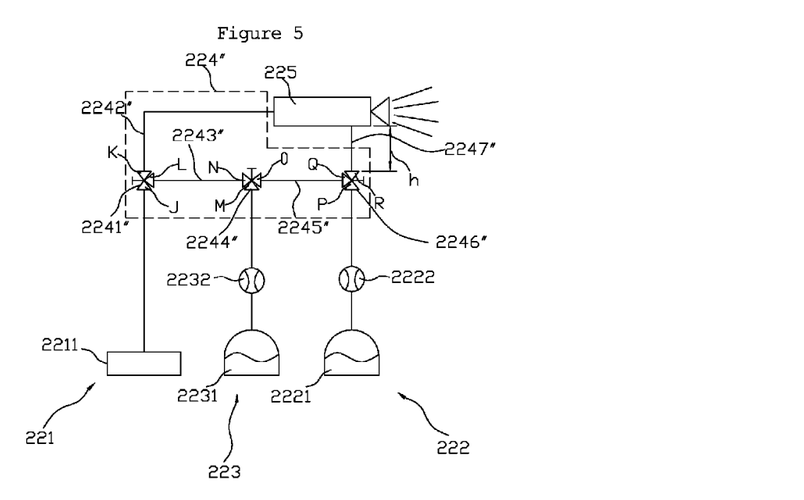
FIG. 5 is an enlarged view fully illustrating a reducing agent supply device according to still another embodiment of the present invention.

FIG. 2 is a block diagram illustrating an exhaust gas denitrification system according to an embodiment of the present invention, FIG. 3 is an enlarged view fully illustrating a reducing agent supply device according to an embodiment of the present invention, FIG. 4 is an enlarged view fully illustrating a reducing agent supply device according to another embodiment of the present invention, and FIG. 5 is an enlarged view fully illustrating a reducing agent supply device according to still another embodiment of the present invention.

With reference to FIGS. 2 to 5, an exhaust gas denitrification system 2 according to an embodiment of the present invention includes a feed unit 21, a reducing agent supply device 22, a reaction chamber 23, a reactor 24, a control unit 25, a discharge unit 26, and so on.

The feed unit 21 is configured such that a gas or fluid (hereinafter referred to as an "exhaust gas") containing nitrogen oxide discharged from an LNG gas discharge unit for small and medium-sized cogeneration or an engine for thermal power generation is fed, and this unit includes an output sensor 211, and so on.

The output sensor 211 is connected to one side of the feed unit 21 so that information about the load of an exhaust gas fed into the feed unit 21 is sensed and transmitted to a control unit 25 which will be described later. Depending on the load of the exhaust gas fed into the feed unit 21, the amount of nitrogen oxide contained in the exhaust gas is determined, and thus information including RPM, current, outlet temperature, etc., which may be used to determine the load of the exhaust gas, is transmitted to the control unit 25, and the control unit 25 performs a control function in such a manner that the amount of a reducing agent adapted to denitrify nitrogen oxide contained in the exhaust gas is supplied from the reaction chamber 23.

As illustrated in FIGS. 2 and 3, the reducing agent supply device 22 is configured such that a reducing agent is supplied to the inside of a reaction chamber 23 which will be described later, and the reducing agent supply device 22 includes an air supply unit 221, a reducing agent supply unit 222, a water supply unit 223, a selective supply unit 224, a spray unit 225, and so on.

The air supply unit 221 is configured to supply external air to the selective supply unit 224, and is controlled by the control unit 25. The air supply unit 221 includes an air compression unit 2211, and so on.

The air compression unit 2211 is configured to cause air flow so that external air may be supplied to the selective supply unit 224, and, for example, the air compression unit 2211 may include an air blower, a compressor, etc.

The reducing agent supply unit 222 is configured to supply a reducing agent to the selective supply unit 224, and is controlled by the control unit 25. The reducing agent supply unit 222 includes a reducing agent storage tank 2221, and so on. The reducing agent may include aqueous ammonia, aqueous urea, etc.

The reducing agent storage tank 2221 is configured to store a reducing agent, and the reducing agent storage tank 2221 may be formed in a variety of shapes, such as a cylindrical shape, a rectangular shape, etc., and may be formed to have various sizes and capacities using a variety of materials such as SUS304 or SPV300.

The water supply unit 223 is configured to supply water to the selective supply unit 224, and includes a water storage tank 2231, and so on.

The water storage tank 2231 is configured to store water, and the water storage tank 2231 may be formed in a variety of shapes, such as a cylindrical shape, a rectangular shape, etc., and may be formed to have various sizes and capacities using a variety of materials such as plastic resins, etc., so as not to corrode.

The selective supply unit 224 is configured to receive air, a reducing agent and water from the air supply unit 221, the reducing agent supply unit 222 and the water supply unit 223, respectively, so that at least one of the air, the reducing agent and the water is selectively supplied to the spray unit 225. The selective supply unit 224 includes an air flow control valve 2241, an air passage 2242, a flow control valve 2243, a reducing agent passage 2244, and so on.

The air flow control valve 2241 is configured such that one end thereof is connected to the outlet of the air compression unit 2211 to control the amount of air supplied to the spray unit 225 via the air passage 2242, and may include a 2-way valve of a ball valve type, etc.

The air passage 2242 is configured such that one end thereof is connected to the outlet of the air flow control valve 2241 and the other end thereof is connected to the spray unit 225 to supply air to the spray unit 225.

The flow control valve 2243 is configured to control the supply of the reducing agent and water so that the reducing agent or water is selectively supplied to the reducing agent passage 2244, and the flow control valve 2243 may include a 3-way valve. Both inlets A, B of the flow control valve 2243 are respectively connected to the outlet of the reducing agent storage tank 2221 and the outlet of the water storage tank 2231, and the outlet C of the flow control valve 2243 is connected to one end of the reducing agent passage 2244. The principle of operation in which the reducing agent and water are selectively supplied to the reducing agent passage 2244 by means of the flow control valve 2243 will be specified later.

The reducing agent passage 2244 is configured such that one end thereof is connected to the outlet of the flow control valve 2243 and the other end thereof is connected to the spray unit 225 to supply the reducing agent or water to the spray unit 225.

The selective supply unit 224 is preferably provided in the form of a small panel so that the volume of the selective supply unit 224 is minimized, and the length h of the reducing agent passage 2244 is set to less than 2 m, thus minimizing the amount of the reducing agent which remains behind in the reducing agent passage and thus solidifies due to continuous use of the reducing agent supply device 22 or a temporary malfunction thereof.

According to another embodiment of the invention, the selective supply unit 224 may further include a flow control pump 2245 which is connected to one side of the reducing agent passage 2244 so as to suck the reducing agent or water depending on the switching state of the flow control valve 2243. The flow control pump 2245 may adjust the supply of the reducing agent or water by regulating the intensity of the output. For example, the flow control pump may include YAD-12211 (½") having a flow rate of 5.7~85 liter/min and made of SCS13 (body) and SUS316 (trim), available from Daelim Integrated Instruments.

The spray unit 225 is configured such that at least one of the air, the reducing agent and the water supplied from the selective supply unit 224 connected thereto is sprayed into the reaction chamber 23, and the spray unit 225 is connected to one end of the air passage 2242 and one end of the reducing agent passage 2244. For example, the spray unit may include a spray nozzle, such as a wide-angle round spray (setup No: 26) having a spraying rate of 33 liter/hr and made of SUS304, available from Spraying Systems Co. Korea.

Below is a description of the principle of operation in which the reducing agent is supplied to the reaction chamber 23 by the reducing agent supply device 22 having the above configuration, and blockage of the reducing agent passage 2244 and the spray unit 225 may be prevented, with reference to FIGS. 2 and 3.

Specifically, according to the principle of operation in which the reducing agent is supplied to the reaction chamber 23 via the spray unit 225, when the amount of fed nitrogen oxide is sensed by the output sensor 211 and transmitted to the control unit 25, the control unit 25 opens the flow control valve 2243 in a direction of A-C to operate a flow control pump 2245. As the flow control pump 2245 operates, the reducing agent stored in the storage tank sequentially passes through the flow control valve 2243 and the reducing agent passage 2244 and is then fed into the spray unit 225. Furthermore, the control unit 25 operates an air compression unit 2211 while operating the flow control pump 2245, and thus external air is fed into the spray unit 225 via the air flow control valve 2241 and the air passage 2242. The reducing agent fed into the spray unit 225 is spouted by the air fed into the spray unit 225 and thus discharged to the reaction chamber 23. In the course of continuously spraying the reducing agent into the reaction chamber 23 via the spray unit 225, the reducing agent fed into the spray unit 225 is not completely discharged to the reaction chamber 23 but may partially remain behind in the spray unit 225. As such, the remaining reducing agent may solidify and may thus block the spray unit 225. Also in the course of continuously feeding the reducing agent into the spray unit 225, because the reducing agent has predetermined viscosity, a dead zone where the reducing agent does not flow but remains still is created in the reducing agent passage 2244. The reducing agent which does not flow but remains still may solidify, and the solidification thereof is further carried out in the course of continuously supplying the reducing agent to the spray unit 225, undesirably blocking the reducing agent passage 2244 due to the solidified reducing agent. Moreover, in the case where the exhaust gas denitrification system ceases to operate due to a temporary malfunction, the reducing agent may remain behind in the reducing agent passage 2244 and the spray unit 225 and thus solidifies, undesirably blocking the reducing agent passage 2244 or the spray unit 225.

When the spray unit 225 and the reducing agent passage 2244 are blocked in this way, the reducing agent cannot be supplied any more to the reaction chamber 23, and thus the reducing agent which remains behind in the spray unit 225 and the reducing agent passage 2244 is required to be removed. According to the principle of operation in which blockage of the spray unit 225 and the reducing agent passage 2244 is prevented, if the reducing agent is not supplied any more to the reaction chamber 23, the control unit 25 opens the flow control valve 2243 in a direction of B-C in a state of the flow control pump 2245 and the air compression unit 2211 operating, so that the reducing agent is not supplied any more to the spray unit 225 and the water stored in the water storage tank 2231 passes through the flow control valve 2243 and the reducing agent passage 2244. While the water passes through the reducing agent passage 2244 and the spray unit 225, it pushes the remaining reducing agent to the reaction chamber 23, thus discharging the reducing agent. Also, the water dissolves the solidified reducing agent which remains behind in the reducing agent passage 2244 and the spray unit 225, so that the reducing agent may be discharged to the reaction chamber 23. Because ammonia or urea used as the reducing agent has high polarity, it easily dissolves in water. Hence, the supply of water enables the blockage problems of the reducing agent passage 2244 and the spray unit 225 to be solved. The reducing agent which is dissolved in water and then discharged to the reaction chamber 23 has a different concentration and cannot thus be used again, and ultimately is discharged to the outside via the discharge unit 26. The reducing agent which is dissolved in water and discharged has high concentration. When such a reducing agent is discharged in a large amount via the discharge unit 26, environmental or legal problems may be caused, and a suction pump for an analyzer connected to the discharge unit 26 and an analyzer 261 may be damaged. So, the length h of the reducing agent passage 2244 is set to less than 2 m, thereby minimizing the amount of the reducing agent which remains behind in the reducing agent passage 2244 and thus solidifies. After the blockage problems of the reducing agent passage 2244 and the spray unit 225 are solved, the flow control valve 2243 is opened in a direction of A-C so that the reducing agent is supplied again to the spray unit 225.

According to another embodiment of the present invention, a reducing agent supply device is described with reference to FIG. 4. Compared to the reducing agent supply device described referring to FIG. 3 (hereinafter referred to a "first embodiment"), the reducing agent supply device is configured as in the first embodiment, with the exception of further comprising an air bypass 2246' which is connected to each of the air passage 2242' and the reducing agent passage 2244', an air control valve 2247' which is located at a position where the air passage 2242' and the air bypass 2246' are connected, instead of the air flow control valve 2241, so that air is supplied to the spray unit 225 via the air passage 2242' or is supplied to the reducing agent passage 2244' via the air bypass 2246', and a backflow prevention valve 2248' which is located at a position where the air bypass 2246' and the reducing agent passage 2244' are connected so that the reducing agent or water fed into the reducing agent passage 2244' is prevented from being fed into the air bypass 2246'. For example, the air control valve 2247' and the backflow prevention valve 2248' may include a 3-way type valve, etc.

Below is a description of the principle of operation in which the reducing agent is supplied to the reaction chamber 23 by the reducing agent supply device 22 having the above configuration, and blockage of the reducing agent passage 2244' and the spray unit 225 may be prevented, with reference to FIGS. 2 and 4.

The principle of operation in which the reducing agent is supplied to the reaction chamber 23 via the spray unit 225 is the same as in the first embodiment, with the exception that the air control valve 2247' and the backflow prevention valve 2248' are controlled to open in directions of D-F and G-I, respectively. According to the principle of operation in which blockage of the reducing agent passage 2244' and the spray unit 225 due to continuous use of the reducing agent supply device 22 or a malfunction thereof may be prevented, the flow control valve 2243' is controlled to open in a direction of B-C, so that the reducing agent is not supplied any more to the reducing agent passage 2244', and water is fed into the reducing agent passage 2244', whereby the reducing agent which remains behind in the reducing agent passage 2244' and the spray unit 225 is discharged to the reaction chamber. Then, operation of the flow control pump 2245' is stopped so that water is not supplied, and the air control valve 2247' and the backflow prevention valve 2248' are opened in directions of D-E and H-I, respectively, so that air is supplied to the reducing agent passage 2244' after the outlet of the flow control pump 2245'. The air fed into the reducing agent passage 2244' after the outlet of the flow control pump 2245' functions such that the water which remains behind in the reducing agent passage 2244' after the outlet of the flow control pump 2245' is pushed to the spray unit 225, thus preventing the presence of water in the reducing agent passage 2244'. Thereby, when the reducing agent is supplied again, the concentration of the reducing agent may be prevented from decreasing and the reducing agent passage 2244' may be prevented from corroding due to water.

According to still another embodiment of the invention, as illustrated in FIG. 5, a reducing agent supply device 22 includes an air supply unit 221, a reducing agent supply unit 222, a water supply unit 223, a selective supply unit 224", and a spray unit 225, as in the first embodiment, and respective parts perform the same functions as those referred to by the same names in the first embodiment, and thus only a reducing agent supply unit 222, a water supply unit 223, and a selective supply unit 224", which are different in a detailed configuration from the first embodiment, are described below.

The reducing agent supply unit 222 includes a reducing agent storage tank 2221 for storing a reducing agent, a reducing agent supply pump 2222, one end of which is connected to the outlet of the reducing agent storage tank 2221 so that the reducing agent is supplied to the selective supply unit 224", and so on.

The water supply unit 223 includes a water storage tank 2231 for storing water, a water supply pump 2232, one end of which is connected to the outlet of the water storage tank 2231 so that water is supplied to the selective supply unit 224", and so on.

The selective supply unit 224" includes an air regulating valve 2241", the inlet J of which is connected to the outlet of the air compression unit 2211 so that the supply of air to the air passage 2242" or the air bypassing passage 2243" is controlled, an air passage 2242", one end of which is connected to one outlet K of the air regulating valve 2241" so that air is supplied to the spray unit 225, an air bypassing passage 2243", one end of which is connected to the other outlet L of the air regulating valve 2241" and the other end of which is connected to one inlet N of a water regulating valve 2244" which will be described later, the water regulating valve 2244", both inlets M, N of which are respectively connected to the outlet of the water supply pump 2232 and the other end of the air bypassing passage 2243" so that selective supply of air or water to the water passage 2245" is controlled, a water passage 2245", one end of which is connected to the outlet O of the water regulating valve 2244" and the other end of which is connected to one inlet Q of a reducing agent regulating valve 2246", the reducing agent regulating valve 2246", both inlets P, Q of which are respectively connected to the outlet of the reducing agent supply pump 2222 and the other end of the water passage 2245" so that supply of air, water and a reducing agent to a reducing agent passage 2247" is controlled, and the reducing agent passage 2247", one end of which is connected to the outlet R of the reducing agent regulating valve 2246" so that any one of air, water and the reducing agent is supplied to the spray unit 225. The selective supply unit 224" is preferably provided in the form of a small panel so as to minimize the volume of the selective supply unit 224", and the length h of the reducing agent passage 2247" is set to less than 2 m, thus minimizing the amount of the reducing agent which remains behind in the reducing agent passage and thus solidifies due to continuous use of the reducing agent supply device 22 or a temporary malfunction thereof.

Below is a description of the principle of operation in which the reducing agent is supplied to the reaction chamber 23 by the reducing agent supply device 22 having the above configuration, and blockage of the reducing agent passage 2247" and the spray unit 225 may be prevented, with reference to FIGS. 2 and 5.

Specifically, according to the principle of operation in which the reducing agent is supplied to the reaction chamber 23, when the output sensor 211 transmits information about the amount of nitrogen oxide to the control unit 25, the control unit 25 opens the reducing agent regulating valve 2246" in a direction of P-R so that the reducing agent supply pump 2222 operates. As the reducing agent supply pump 2222 operates, the reducing agent stored in the reducing agent storage tank 2221 sequentially passes through the reducing agent supply pump 2222, the reducing agent regulating valve 2246", and the reducing agent passage 2247" and is then fed into the spray unit 225. Also the control unit 25 opens the air regulating valve 2241" in a direction of J-K while the reducing agent is supplied, so that an air compression unit 2211 operates, whereby air is fed into the spray unit 225 via the air passage 2242".

According to the principle of operation in which blockage of the reducing agent passage 2247" and the spray unit 225 due to continuous use of the reducing agent supply device 22 or a malfunction thereof may be prevented, in the case where the spray unit 225 no longer supplies the reducing agent to the reaction chamber 23, operation of the reducing agent supply pump 2222 is stopped, and the reducing agent regulating valve 2246" and the water regulating valve 2244" are opened in direction of Q-R and M-O, respectively, and thus the water supply pump 2232 is operated, whereby the water stored in the water storage tank 2231 sequentially passes through the water supply pump 2232, the water regulating valve 2244", the water passage 2245", and the reducing agent regulating valve 2246". While the water discharged via the outlet of the reducing agent regulating valve 2246" passes through the reducing agent passage 2247" and the spray unit 225, it dissolves the solidified reducing agent, which is then discharged to the reaction chamber 23. After the blockage problems of the reducing agent passage 2247" and the spray unit 225 are solved, operation of the water supply pump 2232 is stopped, and the air regulating valve 2241" and the water regulating valve 2244" are opened in directions of J-L and N-O, respectively, so that air sequentially passes through the air bypassing passage 2243", the water passage 2245", and the reducing agent passage 2247". Thereby, the water which remains behind in the water passage 2245" and the reducing agent passage 2247" is pushed to the spray unit 225 and discharged to the reaction chamber 23. Because water no longer remains in the water passage 2245" and the reducing agent passage 2247", the water passage 2245" and the reducing agent passage 2247" may be prevented from corroding due to water, and the concentration of the reducing agent may also be prevented from decreasing when the reducing agent is supplied again.

The reaction chamber 23 is configured such that an exhaust gas fed via the feed unit 21 is mixed with the reducing agent in a liquid phase sprayed via the spray unit 225 so that the reducing agent in a liquid phase is converted into gaseous ammonia, thus producing a gas mixture of gaseous ammonia and exhaust gas. For example, in the case where aqueous urea is used as the reducing agent, aqueous urea sprayed via the spray unit 225 is mixed with the exhaust gas at a high temperature and thus receives heat via the exhaust gas and is converted into gaseous ammonia through the reaction of the following scheme, after which the gas mixture of ammonia and exhaust gas is supplied to the reactor 24.

$$xH_2O+CO(NH_2)_2 \rightarrow 2NH_3+CO_2+(x-1)H_2O$$

The reactor 24 contains a catalyst therein, so that nitrogen oxide (NOx) in the gas mixture of ammonia and exhaust gas is denitrified into a harmless component, and may include, for example, a SCR product available from SK. That is, nitrogen oxide (NOx) in the fed gas mixture of ammonia and exhaust gas is converted into a harmless component through the reaction as shown in the following schemes by the action of the catalyst, and is then discharged to the outside via the discharge unit 26.

$$4NO+4NH_3+O_2 \rightarrow 4N_2+6H_2O$$

$$2NO_2+4NH_3+O_2 \rightarrow 3N_2+6H_2O$$

As such, examples of the catalyst may include a variety of products using oxides of V, Mo, W, Cu, Ni, Fe, Cr, Mn, Sn, etc., sulfates, rare earth metal oxides, precious metals and so on as a catalytic active species and $Al_2O_3$, $TiO_2$, activated carbon, zeolite, silica and the like as a catalyst support. Currently available are $V_2O_5$ (vanadium pentoxide), $MoO_3$ (molybdenum trioxide), and $WO_3$ (tungsten trioxide), each of which includes $TiO_2$ (titanium oxide) as a support. A catalyst using $Al_2O_3$ as a support may function to produce sulfates with respect to SOx-containing exhaust gases such as exhaust gases of coal and heavy oil fuel, thus decreasing a specific surface area undesirably causing deterioration, and thereby this catalyst may be applied only to SOx-free exhaust gases.

The control unit 25 is configured to control the entire exhaust gas denitrification system according to the present invention, and performs the functions of controlling/regulating the entire system, including determining whether an appropriate amount of the reducing agent is supplied for a given amount of nitrogen oxide measured by the output sensor 211 to adjust the amount of the reducing agent supplied to the reaction chamber 23, controlling the reducing agent supply device 22 to remove the reducing agent which remains behind in the reducing agent passage or the spray unit so as to prevent the movement of the reducing agent and the blockage of the spray unit, etc.

The discharge unit 26 is configured to discharge the denitrified exhaust gas, and includes an analyzer 261, and so on.

The analyzer 261 senses the nitrogen oxide present in the denitrified exhaust gas which is discharged via the discharge unit 26, and transmits it to the control unit 25. The control unit 25 analyzes information transmitted from the analyzer 261 and determines whether the exhaust gas is denitrified on the basis set by the exhaust gas denitrification system. A suction pump (not shown) for the analyzer is disposed between the analyzer 261 and the discharge unit 26, so that the exhaust gas discharged from the discharge unit 26 is supplied to the analyzer 261.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A reducing agent supply device, comprising:
   a selective supply unit including an air passage, an air bypass, an air control valve, a backflow prevention valve, and a flow control valve, the flow control valve having an outlet and a plurality of inlets,
   a reducing agent supply unit connected to a first inlet of the plurality of inlets of the flow control valve and configured to supply a reducing agent to the selective supply unit,
   a water supply unit connected to a second inlet of the plurality of inlets of the flow control valve and configured to supply water to the selective supply unit,
   a spray unit connected to the outlet of the flow control valve of the selective supply unit, the selective supply unit being configured to selectively supply any one of the reducing agent from the reducing agent supply unit and the water supplied from the water supply unit to a reducing agent passage connected to the spray unit, the spray unit being configured to spray the reducing agent or the water supplied from the selective supply unit, and
   an air supply unit for supplying air to the selective supply unit, the air supply unit being connected to the air passage and configured to supply air therethrough to the spray unit, the air bypass connecting the air passage to the reducing agent passage wherein the air control valve is located between the air bypass and the air passage and the air control valve is configured to selectively provide airflow therethrough, the air bypass including the backflow prevention valve configured to prevent flow of the reducing agent and the water from the reducing agent passage to the air passage, wherein the selective supply unit supplies the water to the spray unit when the spray unit is blocked due to solidification of the reducing agent which remains behind therein because of a process in which the spray unit continuously sprays the reducing agent or a temporary malfunction of the reducing agent supply device, thus preventing blockage of the spray unit.

2. The reducing agent supply device of claim 1, wherein the selective supply unit further comprises a flow control pump which is connected to one side of the reducing agent passage so as to suck the reducing agent or the water depending on a switching state of the flow control valve.

3. The reducing agent supply device of claim 1, wherein the reducing agent passage has a length of less than 2 m.

4. A reducing agent supply device, comprising:
a selective supply unit comprising:
an air regulating valve having a plurality of outlets and an inlet and configured to selectively provide communication between the inlet and one of the plurality of outlets,
an air passage having a first end connected to a first outlet of the plurality of outlets of the air regulating valve and a second end,
an air bypass having a first end connected to a second outlet of the plurality of outlets of the air regulating valve and a second end,
a water regulating valve having a plurality of water regulating valve inlets and a water regulating valve outlet and configured to selectively provide communication between one of the plurality of water regulating valve inlets and the water regulating valve outlet, a first water regulating valve inlet of the plurality of water regulating valve inlets being connected to the second end of the air bypass,
a water passage having a first end connected to the water regulating valve outlet and having a second end,
a reducing agent regulating valve having a plurality of reducing agent regulating valve inlets and a reducing agent regulating valve outlet and configured to selectively provide communication between one of the plurality of reducing agent regulating valve inlets and the reducing agent regulating valve outlet, a first reducing agent regulating valve inlet of the plurality of reducing agent regulating valve inlets being connected to the second end of the water passage, and
a reducing agent passage having a first end connected to the reducing agent regulating valve outlet and having a second end;
a reducing agent supply unit connected to and configured to supply a reducing agent to a second inlet of the plurality of inlets of the reducing agent regulating valve;
a water supply unit connected to and configured to supply water to a second inlet of the plurality of inlets of the water regulating valve,
an air supply unit connected and configured to supply air to the selective supply unit, the air supply unit being connected at the inlet of the air regulating valve,
a spray unit connected to the selective supply unit, the spray unit being connected to the second end of the air passage and the second end of the reducing agent passage, wherein the selective supply unit is configured to selectively supply any one of the reducing agent from the reducing agent supply unit and the water supplied from the water supply unit to the spray unit, the spray unit being configured to spray the reducing agent or the water supplied from the selective supply unit, and wherein the selective supply unit supplies the water to the spray unit when the spray unit is blocked due to solidification of the reducing agent which remains behind therein because of a process in which the spray unit continuously sprays the reducing agent or due to a temporary malfunction of the device, thus preventing blockage of the spray unit.

5. The reducing agent supply device of claim 4, wherein the reducing agent passage has a length of less than 2 m.

6. The reducing agent supply device of claim 4, wherein the selective supply unit further comprises a flow control pump which is connected to one side of the reducing agent passage so as to suck the reducing agent or the water depending on a switching state of a flow control valve.

7. An exhaust gas denitrification system, comprising:
a reactor;
a reaction chamber in fluid communication with the reactor;
an exhaust feed unit connected to and configured to provide fed exhaust gas to the reaction chamber;
a reducing agent supply device for supplying a reducing agent to the reaction chamber, the reducing agent supply device comprising:
a selective supply unit comprising:
an air regulating valve having a plurality of outlets and an inlet and configured to selectively provide communication between the inlet and one of the plurality of outlets,
an air passage having a first end connected to a first outlet of the plurality of outlets of the air regulating valve and having a second end,
an air bypass having a first end connected to a second outlet of the plurality of outlets of the air regulating valve and having a second end,
a water regulating valve having a plurality of water regulating valve inlets and a water regulating valve outlet and configured to selectively provide communication between one of the plurality of water regulating valve inlets and the water regulating valve outlet, a first water regulating valve inlet of the plurality of water regulating valve inlets being connected to the second end of the air bypass,
a water passage having a first end connected to the water regulating valve outlet and having a second end,
a reducing agent regulating valve having a plurality of reducing agent regulating valve inlets and a reducing agent regulating valve outlet and configured to selectively provide communication between one of the plurality of reducing agent regulating valve inlets and the reducing agent regulating valve outlet, a first reducing agent regulating valve inlet of the plurality of reducing agent regulating valve inlets being connected to the second end of the water passage, and
a reducing agent passage having a first end connected to the reducing agent regulating valve outlet and having a second end;
a reducing agent supply unit connected to and configured to supply a reducing agent to a second inlet of the plurality of inlets of the reducing agent regulating valve;

a water supply unit connected to and configured to supply water to a second inlet of the plurality of inlets of the water regulating valve, an air supply unit connected and configured to supply air to the selective supply unit, the air supply unit being connected at the inlet of the air regulating valve, a spray unit connected to the selective supply unit, the spray unit being connected to the second end of the air passage and the second end of the reducing agent passage, wherein the selective supply unit is configured to selectively supply any one of the reducing agent from the reducing agent supply unit and the water supplied from the water supply unit to the spray unit, the spray unit being configured to spray the reducing agent or the water supplied from the selective supply unit, and wherein the selective supply unit supplies the water to the spray unit when the spray unit is blocked due to solidification of the reducing agent which remains behind therein because of a process in which the spray unit continuously sprays the reducing agent or due to a temporary malfunction of the device, thus preventing blockage of the spray unit.

8. The reducing agent supply device of claim 7, wherein the selective supply unit further comprises a flow control pump which is connected to one side of the reducing agent passage so as to suck the reducing agent or the water depending on a switching state of a flow control valve.

9. The reducing agent supply device of claim 7, wherein the reducing agent passage has a length of less than 2 m.

* * * * *